United States Patent Office 3,054,150
Patented Sept. 18, 1962

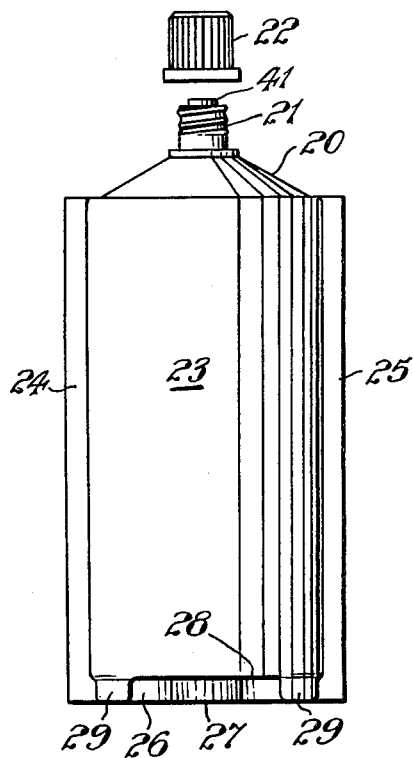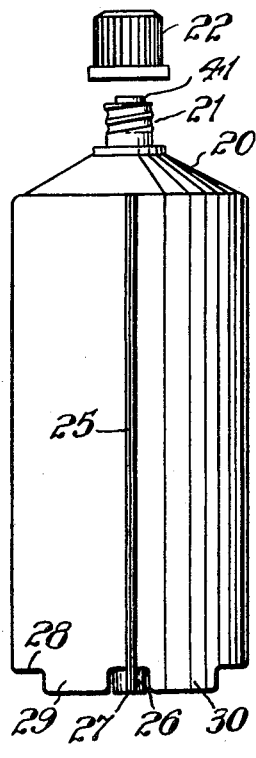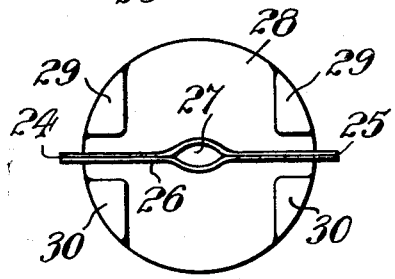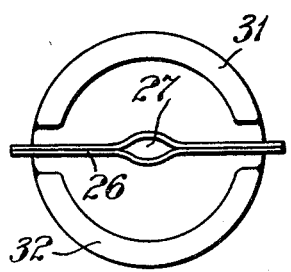

3,054,150
METHOD OF FORMING A CONTAINER
Willem Pieter Adriaan Ditmar, Voorburg, Netherlands, assignor to Unilever N.V., Rotterdam, Netherlands, a company of the Netherlands
Filed Feb. 26, 1960, Ser. No. 11,238
Claims priority, application Great Britain Feb. 27, 1959
5 Claims. (Cl. 18—56)

This invention relates to the manufacture of containers made of thermoplastic material.

According to one aspect of the present invention there is provided a method of forming a container having a neck, the method comprising doubling over sheet thermoplastic material into the shape of a U and blow moulding the container from the doubled over sheet material, the neck being formed from a part of the doubled over sheet material not containing an edge or seam.

According to another aspect of the present invention there is provided a method of forming a container having a neck, the method comprising doubling over a sheet of thermoplastic material into the shape of a U, clamping together the superimposed edges of the sheet, a nozzle being disposed between the clamped together parts, and then with the thermoplastic material in a mouldable state introducing fluid under pressure through the nozzle to expand the sheet in a confining mould, the neck being formed seamless from a part of the sheet not containing an edge.

From a further aspect the present invention provides a method of forming a container having a neck, the method comprising doubling over a section of a web of thermoplastic material into the shape of a U, clamping together the superimposed edges of the section opposite the bottom of the U and also the side edges of the section stretching between said first mentioned edges and the bottom of the U, a nozzle being disposed between the clamped together parts, and then with the thermoplastic material in a mouldable state introducing fluid under pressure through the nozzle to expand said section in a confining mould, the neck being formed seamless from a part of the section not containing a said edge of the section.

The thermoplastic material can be heated to a mouldable state prior to said clamping. If the sheet material is produced by extrusion, then the container can be formed while the sheet is still in a hot condition.

The nozzle may be disposed between the edges opposite the bottom part of the U. There may be more than one nozzle.

The neck is preferably formed from the bottom part of the U.

When collapsible tubes are manufactured in accordance with the present invention, the opening made by said nozzle can be arranged to extend over substantially the whole width of the bottom of the collapsible tube.

An external screw thread can be formed on the neck for receiving a screw-on closure cap.

The container may have a fin-like seam running down opposite sides and across its bottom, the seam being formed by the clamped together edges of the doubled over sheet material. The bottom of the container can be formed with protrusions on opposite sides of the fin-like seam, these protrusions having a height at least equal to that of the seam so that these protrusions can serve as feet for the container to stand on.

The invention will now be particularly described with reference to the accompanying diagrammatic drawings, in which:

FIGURE 1 is a front view of a container according to the invention;

FIGURE 2 is a side view thereof;

FIGURE 3 is a plan view of the bottom of the container shown in FIGURES 1 and 2;

FIGURE 4 is a similar view as FIGURE 3 of a modification; and

Figure 5:
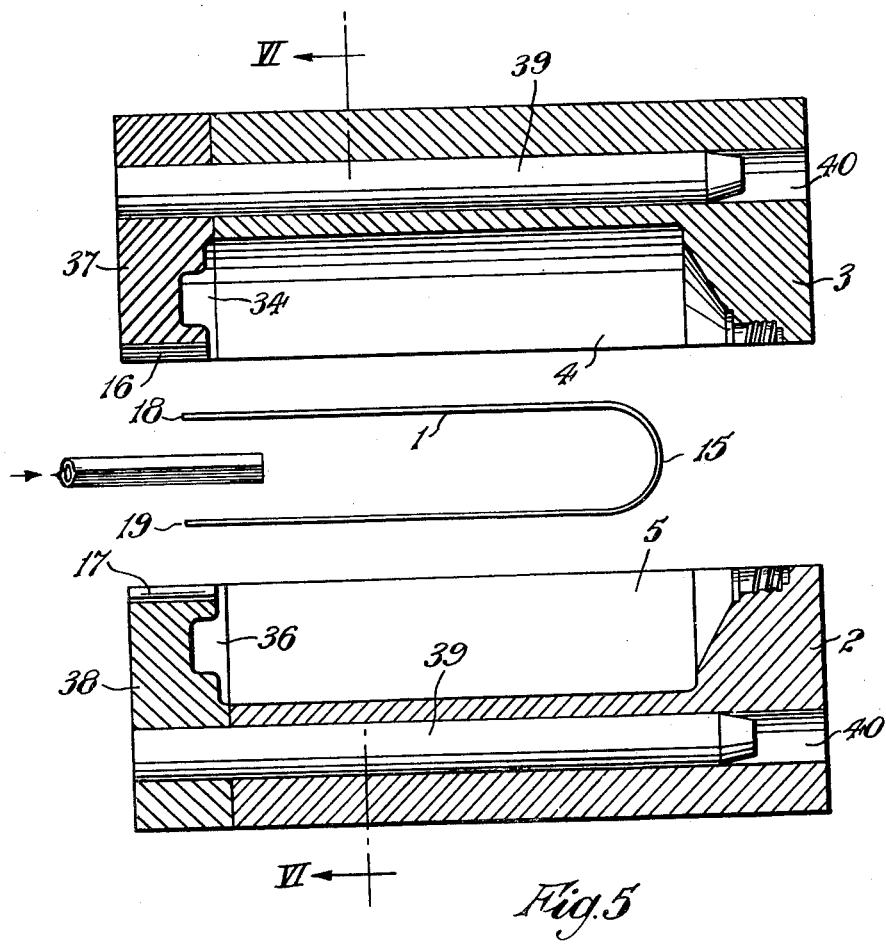
FIGURES 5 and 6 illustrate the manner in which the container shown in FIGURES 1, 2 and 3 is made, FIGURE 5 being a section taken on the line V—V of FIGURE 6 and FIGURE 6 being a section taken on the line VI—VI of FIGURE 5.
Figure 6:
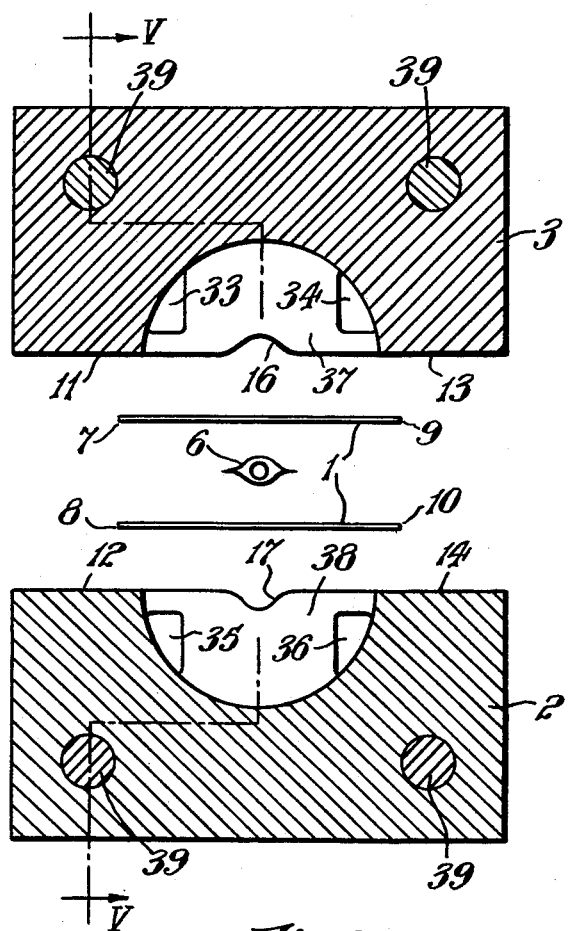

The container shown in FIGS. 1, 2 and 3 is a bottle, and is made from a sheet 1 of thermoplastic material doubled over in the shape of a U, as shown in FIGS. 5 and 6. This sheet 1 is heated to a mouldable condition and then brought between the halves 2 and 3 of a mould having cavities 4 and 5 which determine the shape of the bottle. A nozzle 6 for introducing compressed gas is disposed in the open end of the U.

The width of the U-shaped sheet is such that the edges 7, 8 and 9, 10 are clamped between the surfaces 11, 12 and 13, 14, respectively, of the mould when it is closed. The U-shaped sheet 1 has such a length and is positioned so that when the mould is closed the bottom part 15 of the U is not clamped between the halves 2 and 3, but extends freely across the cavity 4, 5 whilst the edges 18, 19 are clamped together, as are the edgfes 7, 8 and the edges 9, 10. In this way the superimposed edges of the sheet are clamped together.

Each of the halves 2 and 3, has a recess 16, 17 respectively. These recesses register and correspond with the outer surface of the nozzle 6. Thus, the recesses 16 and 17 confine between them a passage containing the nozzle 6 and edges 18 and 19 of the sheet when the mould is closed.

When compressed air is introduced through the nozzle 6, the sheet is expanded into the shape of the confining mould formed by the walls of the cavities 4, 5.

The shape of the cavities 4 and 5 is such that the top 20 of the bottle and the neck 21 are formed from the bottom part 15 of the U and therefore are seamless. The neck has an annular cross-section and is formed with an external screw thread. Thus, a cap 22 can be screwed on the neck 21.

The body 23 of the bottle carries a fin-like seam having portions 24 and 25 running down opposite sides, these portions being connected by a portion 26 across the bottom of the container. The seam portions 24 and 25 result from the sealing of the edges 7 and 8 and the edges 9 and 10, respectively, and seam portion 26 results from the sealing of edges 18 and 19.

The edges 18 and 19 are not sealed together where the nozzle 6 is located during formation of the bottle and thus delimit an opening 27 having an internal shape which corresponds with the external shape of the nozzle 6. Because nozzle 6 has a flattened cross-section where it passes between the edges 18 and 19, the opening 27 also has a flattened cross-section which facilitates closing this opening by heat-sealing when the contents to be packed in the bottle have been introduced through said opening.

The bottom 28 of the bottle is provided with two pairs of identical protrusions 29 and 30 on opposite sides of seam portion 26. These protrusions have a height equal to that of the seam portion 26. The protrusions 29 and 30 enable the bottle to stand in an upright position. With the modification shown in FIG. 4, the two pairs of protrusions 29, 30 are replaced by two arcuate protrusions 31 and 32 on opposite sides of the bottom seam portion 26.

The protrusions of the bottom 28 are obtained by arranging recessed parts 33, 34, 35 and 36 in the halves 2 and 3 of the mould. In order that the bottle can be disengaged from the mould, the bottom part of the mould is formed by two halves 37 and 38 connected by pins 39 to the halves 3 and 2 respectively. Fins 39 are slidably engaged in bores 40 arranged in the halves 2 and 3, so that the bottom 37, 38 of the closed mould can be moved in a left-hand direction in FIG. 5 before the halves 2 and 3 are moved apart.

When the bottle is made, there is no pouring opening in the neck 21. To facilitate the making of an opening, a protrusion 41 is provided which can be cut off when the contents of the bottle are to be first dispensed.

The opening 27 and surrounding part of the fin 26 could have been shaped to form the neck of the container. However, the portion of the fin 28 on each side of the opening 27 could prevent a closure cap being placed over this neck, and also the seam at each side of the opening 27 would prevent a stopper making a good seal in the opening 27. Thus, in accordance with the present invention, by forming the neck 21 from a part of the sheet 1 not containing an edge, namely the bottom part 15 of the U, the neck can be more accurately shaped, with or without a screw thread or similar closure securing means, so that the closure member 22 for the container can make a good fit with the neck.

The above process can be made continuous by using a web of thermoplastic material and operating on consecutive sections of the web, treating each section as if it were the sheet 1.

What is claimed is:

1. A method of forming a container having a neck, comprising the steps of doubling over a sheet of thermoplastic material into the shape of a U, arranging the doubled over sheet between spaced apart mould parts, bringing together the mould parts with the doubled over sheet in a mouldable state to clamp together and seal the superimposed edges of the doubled over sheet, a portion of the doubled over sheet not containing an edge or seam being positioned within a neck section of a container shaped mould cavity formed from the mould parts, and introducing a fluid under pressure to expand said doubled over sheet into contact with said mould cavity, thereby forming a container having a seamless neck.

2. The method as recited in claim 1 wherein a container neck having threads thereon is formed when the fluid is intrdouced under pressure to expand the doubled over sheet into contact with the mould cavity having a threaded neck section.

3. A method of forming a container having a neck, comprising the steps of doubling over a portion of thermoplastic sheet material into the shape of a U, arranging the doubled over portion between spaced apart mould parts, bringing together the mould parts with the doubled over portion of the thermoplastic sheet material in a mouldable state to form a container shaped mould cavity within which the closed end of the U is positioned and to clamp and seal together the superimposed edges of the doubled over portion of the material, a portion of the superimposed edges not being clamped and sealed together thereby to form a nozzle portion, and then introducing a fluid under pressure through the nozzle portion to expand said doubled over portion of the material into contact with said mould cavity to form the container with its neck portion being formed seamless from the closed end of the U.

4. The method as recited in claim 3 wherein the clamping and sealing of the superimposed edges of the doubled over portion of the material leaves a nozzle portion whose width is substantially equal to that of the container.

5. The method as recited in claim 3 wherein a fin-like seam running down opposite sides and across the bottom of the container is formed when the mould parts are brought together, and the bottom of the container is also formed with protrusions on opposite sides of the fin-like seam that are of a height at least equal to that of the seam, thereby serving as feet upon which the container stands.

References Cited in the file of this patent

UNITED STATES PATENTS

| | | |
|---|---|---|
| 2,541,249 | Hobson | Feb. 13, 1951 |
| 2,908,034 | Hackett | Oct. 13, 1959 |
| 2,918,698 | Hagen et al. | Dec. 29, 1959 |

FOREIGN PATENTS

| | | |
|---|---|---|
| 1,106,628 | France | Dec. 21, 1955 |